United States Patent [19]

Leisner et al.

[11] 4,094,339
[45] June 13, 1978

[54] HIGH TEMPERATURE COMBUSTION SHOCK DEBURRING SYSTEM

[75] Inventors: Ernst Leisner, Gerlingen; Wolfgang Ulbricht, Tamm; Helmut Kaufmann, Bischberg, all of Germany

[73] Assignee: Robert Bosch GmbH, Stuttgart, Germany

[21] Appl. No.: 747,490

[22] Filed: Dec. 6, 1976

Related U.S. Application Data

[62] Division of Ser. No. 579,118, May 19, 1975, Pat. No. 4,015,815.

[30] Foreign Application Priority Data

May 17, 1974 Germany .............................. 2424148

[51] Int. Cl.² ............................................. F16K 19/00
[52] U.S. Cl. ..................................... 137/604; 137/583; 137/606; 266/48
[58] Field of Search ................ 137/604, 606, 238, 583; 266/48; 431/263

[56] References Cited

U.S. PATENT DOCUMENTS

| | | | |
|---|---|---|---|
| 1,672,504 | 6/1928 | Sauvey | 137/583 X |
| 3,463,601 | 8/1969 | Childree | 266/48 X |
| 3,642,266 | 2/1972 | Diehl | 266/48 |
| 3,719,205 | 3/1973 | Harris | 137/583 |

FOREIGN PATENT DOCUMENTS 2,157,168  6/1973  France .................................. 266/48

*Primary Examiner*—Robert G. Nilson
*Attorney, Agent, or Firm*—Flynn & Frishauf

[57] ABSTRACT

To isolate shock deburring valve units in a shock deburring system and prevent back-flash or backfire during operation of the deburring system, and absorb thermal and pressure shocks exerted against the deburring valves—which, in operation, are closed—at least one of the valves is separated from the mixing chamber where the explosive force arises by a connecting line which is long enough and encloses therein a volume of the respective gas which is such that under the pressure due to an explosion in the mixing chamber, the gas can compress within the respective connecting line to thermally isolate the valve from the chamber and provide a compressible thermally isolating shock cushion for the respective valve to protect the valve against thermal damage and shock. Preferably, the valve is constructed to use a resiliently deformable sealing material between a portion of the valve bore and the valve sleeve in which a cylindrical insert is located so that pressure transferred to the closed valve will result in inwardly directed radial pressure upon deformation of the deformable substance over the sleeve and against the cylindrical projection to provide a reliable seal and, should damage to the sealing material result, permit self-healing of the respective valve.

6 Claims, 3 Drawing Figures

HIGH TEMPERATURE COMBUSTION SHOCK DEBURRING SYSTEM

This is a division, of application Ser. No. 579,118, filed May 19, 1975 now Pat. No. 4,015,815, Apr. 15, 1977.

The present invention relates to a high temperature combustion shock deburring system and further to a valve construction, suitable therefore and more particularly to a gas valve capable of accepting high differential pressures and high thermal shock, used particularly for thermal deburring machinery, and to thermal deburring apparatus in general, and using, for example, valves of this type.

BACKGROUND AND PRIOR ART

Thermal deburring apparatus includes a mixing chamber in which gases which can be burned under explosive conditions, typically hydrogen and oxygen, are mixed and ignited, for example by a spark plug. The gases are conducted in the mixing chamber under controlled conditions, and then the mixing chamber must be isolated from the gas supply. The valves included in the gas supply which isolate the supply from the mixing chamber are subjected to extremes of operating conditions — thermal as well as pressure shocks under extremely high temperature and pressure conditions. In one position of the valve, passage for gas from a supply to the mixing chamber is free; in another condition, however, gas flow is interrupted and, additionally, the valve must be capable of withstanding explosion pressure and reliably prevent backflash or backfire.

It has previously been proposed to provide a valve for a thermal deburring machine in which the gas inlet is sealed by a ball seat. The ball is held in sealing position by an external force. Such valves are subject to leakage since leaks develop at the seat of the ball, particularly due to contamination, dirt or the like; at the high loads — regarding temperature as well as pressure — any leaks, even small ones, rapidly lead to failure of the valves, and to interruption of proper operation of the entire system, since any areas of leakage or not absolute tightness, tend to wear rapidly upon operation of the deburring machine.

THE PRESENT INVENTION

It is an object of the present invention to provide a thermal shock deburring system in which loading on the valves is minmized. The valve itself should be so arranged that damage to the valve, particularly burnout of the valve seat, is inhibited.

Thermal deburring machines usually utilize oxygen and a combustion gas, the oxygen and the combustion gas — typically hydrogen — being supplied to the mixing and combustion chamber over separate supply lines, each controlled by a separate deburring valve. The valves themselves are connected to the mixing and combustion chamber by separate, individual conduction lines, tubes or hoses. In accordance with the invention, these tubes or hoses are selected to have a comparatively long length, to protect the valves. This is particularly important in thermal deburring machines, since the valves are then separated and shielded from direct contact with the burning or exploding gas since the particular gas component in the line — before having been mixed — acts as a shock absorber, or compression cushion over the explosive burning of the gases in the combustion chamber. Thus, the valves are thermally and pneumatically protected by this cushion of nonburning gas of the single gas component passed through the valves, thus protecting the valves from the hot, burning gas and preventing direct contact of the burning gas with the valve elements.

At least one of the valves — as described and claimed in U.S. Pat. No. 4,015,815 — has a housing which has a bore formed therein which leads to a mixing chamber and to a combustion chamber. A gas inlet duct communicates with the bore, and terminates therein, to supply a combustible gas (for example oxygen for one valve and hydrogen for another) to the bore, and hence to the combustion chamber. A valve plunger is slidable in the bore, movable longitudinally therein by an external force to selectively permit gas flow from the gas duct to enter the bore and hence pass into the mixing and combustion chamber or, alternatingly, to seal the gas duct from the chamber and prevent entry of combustible gas into the chamber. In accordance with the present invention, an insert sleeve is located in the bore, the plunger is formed with an extending projection, extending from the plunger in the direction facing the sleeve and fitting therein; and means are provided to transfer forces which are axially directed on and hence by the plunger to result in inwardly directed circumferential sealing forces being exerted by the sleeve on the projection upon inward movement by the plunger in the bore to securely separate the gas duct from the mixing and combustion chamber. In accordance with a preferred feature of the invention, the force transfer means are a plastically deformable sealing mass, of a material capable of accepting extremes of temperature, such as Teflon ® located at least in part between the wall of the bore and the sleeve, the plunger being formed wth an end face engaging the sealing mass which, upon such engagement, is compressed and transfers the compression force directed axially on the plunger into a radially inwardly directed force passing the sleeve against the projection on the plunger.

Use of a heat-resistant plastically deformable material such as polytetrafluoroethylene resin, for example Teflon ® is particularly suitable. The pressure which may be up to 50 atm. in the supply line and may well exceed 500 atm. upon combustion in the combustion chamber can readily be isolated, so that upon combustion of the gas mixture, the gas supply line is effectively and reliably separated from the mixing and combustion chamber. This material can also handle the high temperatures which arise in the combustion chamber.

In accordance with a feature of the invention, an additional valve is connected to the gas inlet duct to permit venting the gas inlet duct. This valve may be any valve of known type, connected into a branch to the gas line and is provided to vent the gas line after closing of the main valve to isolate the combustion chamber from the supply duct. Any pressure in the supply duct is thus relieved, so that no gas can flow through the main valve to the mixing chamber and hence to the combustion chamber even if the main valve should have a slight leakage or any other defect. Venting the supply line after the main valve to a thermal deburring machine has been closed is particularly advantageous, regardless of the type of main valve which is used, although it is particularly advantageous when using a main valve in accordance with the present invention.

The invention will be described by way of example with reference to the accompanying drawings, wherein.

Figure 1:
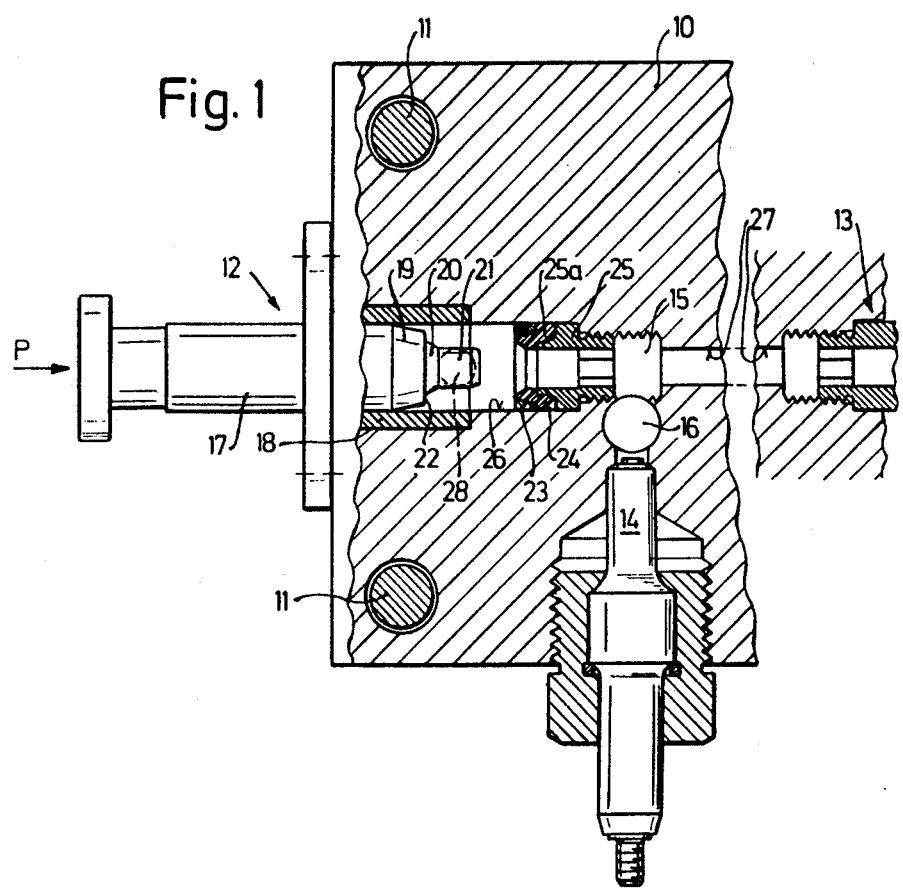
FIG. 1 is a schematic longitudinal cross-sectional view through a valve construction for a thermal deburring machine.

A housing 10 (FIG. 1) is secured by screws or other means 11, shown schematically, to a frame or, for example, to some other machine such as a thermal deburring machine. Two valves 12, 13 are located on the machine, for example in housing 10. Only valve 12 is completely illustrated; valve 13 can be entirely similar to valve 12. Housing 10 further includes a spark plug or ignition device 14 which is provided to ignite the gas mixture in a combustion chamber connected to chamber 16. Typical gases being admitted by valves 12, 13 are hydrogen and oxygen.

Hydrogen and oxygen are conducted through the valves 12, 13 in proper quantities, to be mixed in a mixing chamber 15 formed in the housing 10, and then conducted over a chamber to the combustion chamber (not shown in FIG. 1).

Valves 12 and 13 are identical in all respects, and thus only valve 12 will be described. A cylindrical plunger 17 is guided in a guide way 18 securely attached and fixed in housing 10. The forward end of the plunger 17 has a region of reduced diameter 19. Reduction of the diameter, that is, tapering the circumference of plunger 17 facilitates introducing the plunger into the guide sleeve 18. A second conical portion 20 joins the slightly tapered conical region 19. A cylindrical projection 21 extends from the conical portion 20. The forward end of conical region 19 and the rear end of conical portion 20 are separated from each other by a shoulder 22, extending in cylindrical ring-shaped form circumferentially around plunger 17. An external force P, when exerted against plunger 17, presses the plunger 17 to the right (FIG. 1) to seal the shoulder 22 against a metal ring 23. Metal ring 23 surrounds a ring-shaped sealing sleeve 24 made of polytetrafluoroethylene resin (Teflon ®). A metal bushing 25 is located to the right of the deformable seal 24, screwed in the housing 10.

The material of the sleeve 24 is plastically deformable. The pressure P exerted against plunger 17 is transferred by counter engagement surfaces 20, 22 on to the sealing mass 24 and the plunger is uniform in all directions. This provides for a reliable tight seal between the conical portion 20 of the plunger 17 and the inner wall of the bore in which the plunger is guided. The forward portion 25a of the metallic bushing 25 forms a sleeve in which the cylindrical projection 21 of the plunger is received when the valve is closed. This forward sleeve portion 25a is slightly deformed by the pressure transferred from the plunger to the plastically deformable sealing mass 24, and hence by mass 24 to sleeve portion 25a which will tightly grip and engage the cylindrical projection 21 of the plunger 17.

Gas is admitted through an inlet duct, the opening 28 of which is shown in dashed lines in FIG. 1, located behind the projection 21.

Gases supplied to the chamber 15 from the valves 12 and 13 are mixed in the chamber 15. To provide a gas cushion between the valve structure itself and the mixing chamber 15, a connecting line 27 of substantial length is provided between the inner end of the sleeve 25 and the mixing chamber 15 itself. This connecting line 27 is shown only with respect to the right-hand valve 13, for simplicity of illustration. The unmixed single gas component controlled by the respective valve is compressed upon combustion of the mixed gases in the combustion chamber 16, and thus protects the valve 13 from high temperature arising upon combustion.

To assemble the valve, the Teflon ® mass 24 is first introduced between the metal ring 23 and the bushing 25. Since the sealing mass can be plastically deformed, it will receive the shape illustrated in FIG. 1 when the plunger 17 is moved to the right under influence of the outside force P for the first time. The plunger 17 is applied to the seal with a compression force of about 1,200 kp. This pressure is sufficient to accept the high counter-pressure occuring during combustion, or upon explosion of gases in the chamber 16, while ensuring absolute tightness of the valve. Although the mass 24 uses an essentially plastically deformable material, the material, nevertheless, has some slight elasticity or resiliency. This resiliency or elasticity is sufficient to permit generation of a slight ring-shaped gap when the outer pressure P on the plunger 17 is released, so that a gap will form between the cylindrical projection 21 and the mass 24 or the sleeve-like extension 25a of the bushing 25, so that the plunger can be withdrawn without damaging the seal. Withdrawal of the plunger 17 permits communication of the gas inlet 28 with bore 26, as will be explained in further detail in connection with FIGS. 2 and 3 in which similar parts have been given similar reference numerals.

Figure 2:
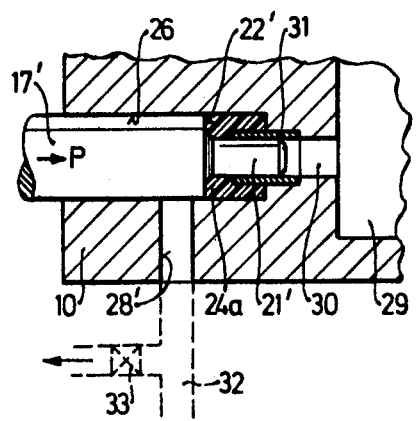
FIG. 2 is a fragmentary cross-sectional view through another embodiment of a valve construction illustrating a different valve sealing arrangement.

FIG. 2: Plunger 17' is formed with a cylindrical projection 21' at its forward end, the projection 21' extending from a shoulder 22' formed by the front face of the plunger 17'. The plunger operates in bore 26. FIG. 2 shows the valve in closed condition. The essential difference in the construction between FIGS. 1 and 2 is the shape of the seal. As illustrated in FIG. 2, the seal 24a is arranged to engage, on the one hand, on the shoulder 22' of the plunger 17' and, on the other, against the cylindrical projection 21', as well as surrounding a cylindrical sleeve 31 located in a bore extension 30 which forms a communication passage between bore 26 and a combustion chamber 29. Sleeve 31 is secured in passage 30. The seal 24a thus engages the shoulder 22', the cylindrical projection 21' of the plunger 17', the inner wall of the bore 26, and the outer circumference of the sleeve 31.

The plunger 17' is withdrawn to the left when the valve is open. Gas supplied through a line 32 can enter through the gas inlet duct 28 into the bore 26 and then pass through passage 30 into the combustion chamber 29. The combustion gas, for example hydrogen, is mixed with oxygen in the combustion chamber 29. Upon movement of the plunger 17' to the right, under an external force P, plunger 17' is pressed in the direction towards the combustion chamber 29, sealing against the plastic seal 24a in the space between the housing 10, plunger 17', cylindrical projection 21' and the sleeve 31. Axial force exerted by the plunger 17' against the plastically deformable mass 24a will be transferred into radially directed forces providing high radially inwardly directed forces against the sleeve 31, to compress the sleeve and elastically deform sleeve 31 to fit closely, in sealing relation, around the cylindrical extension or projection 21' of the plunger 17'.

The seal as described is highly effective. Due to the pre-sealing obtained between the sleeve 31 and the cylindrical projection 21', the sealing mass 24a itself is protected against burn-off. The clearance between the sleeve 31 and the cylindrical projection 21' of plunger 17' can be reduced to a minimum due to the elastic deformation of the sleeve 31. The seal is self-healing, or self-curing in case of damage to the seal, just as in the arrangement in accordance with FIG. 1, since any possible burning or thermal deterioration of the seal at any localized position is compensated by plastic deformation of the sealing material. Due to the comparatively high volume of the seal, it is essentially immune to damage by contamination or dirt.

FIG. 2 illustrates an additional feature, in accordance with the present invention, when a valve is used in the supply line 32 to a deburring machine. An additional valve 33 is connected in the supply line 32 in order to vent line 32 and the gas inlet duct 28. No particularly high requirements are placed on the valve 33, so that any known and customarily used type of valve may be employed therefor. The over-pressure in the supply line 32 and the duct 28 is vented by valve 33, so that after termination of the combustion process in chamber 29, any pressure in the supply line can likewise be relieved. Without such a valve, there may be danger that gas continues to be supplied from line 32 due to pressure therein, thus causing ignition, for example spontaneous ignition of additional gas due to contact with the hot remanent gases escaping from the combustion chamber, thus causing flashback or backfire, and causing continuation of combustion and flaming in the line. This danger is avoided by the venting valve 33.

Figure 3:
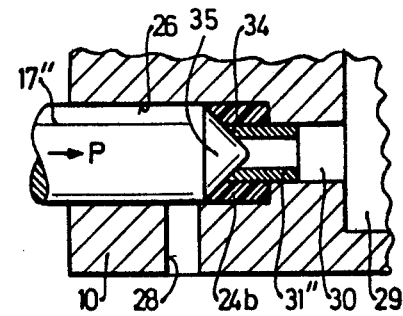
FIG. 3 is another fragmentary cross-sectional view illustrating yet another sealing arrangement.

FIG. 3: The general arrangement is similar to that illustrated in connection with FIGS. 1 and 2. Plunger 17" is slidable in bore 26 formed in housing 10. Gas inlet duct 28 communicates with bore 26. The seal 24b is formed with an inwardly conical taper at the end facing plunger 17". The end of the plunger 17" is formed with a conical projection 35. When the valve is closed, the conical projection 35 seats against a corresponding conical surface 34 formed on sleeve 31" set into passage 30 in the valve housing 10. Sleeve 31" is press-fitted into the passage 30, and communicates with the mixing and combustion chamber 29.

The mixing in combustion chamber 29 is reliably separated from the bore 26 and the gas inlet 28 when the valve is closed. When the valve is open, plunger 17 is retracted. Gas can flow through duct 28 into bore 26 and into the combustion chamber 29. When the valve is closed, that is, when plunger 17" is pressed by an outer force P to the right (FIG. 3), the plastic seal 24b is plastically deformed and compressed in the space between the housing 10 and the sleeve 31", to securely seal the sleeve 31" against the plunger 17. If the seal 24b should be subject to contamination, or to burning, that is, if the seal should not entirely fill the space allocated thereto, the seal will nevertheless provide a tight separation between the chamber 29 and bore 26 by self-healing. Force P will continue to push plunger 17" to the right, and push sleeve 31" to the right towards the chamber 29 until the seal 24b again completely fills the remaining space. Thus, the seal has high volume, is essentially impervious to dirt, or burn-out. The deformable sealing mass is protected against burn-out by the metallic pre-sealing connection between the conical end of plunger 17" and sleeve 31". The arrangement in accordance with FIG. 3 has the additional advantage that no friction will result between the plunger 17" on the one hand and the seal 24b and sleeve 31" on the other.

The valve in accordance with the present invention is particularly suitable to seal the combustion chamber of a thermal deburring machine; it is not limited to such use, however, and can be utilized with various other types of apparatus. It is suitable, for example, for stamping machines, presses, and power generators, such as gas motors, in which extreme requirements are placed on valves located between a combustion chamber and a supply line.

Various changes and modifications may be made and embodiments described in connection with any one of the Figures may be used within the inventive concept with any of the others.

An example of a typical valve construction, for typical gases used in deburring machinery would be:

Gas used: oxygen, hydrogen
Material of line 27: SAE 60310
Internal diameter of line 27: 7 mm
Wall thickness of line 27: >5 mm
Volume of line 27 and valve parts between seal and mixing chamber 15: approx. 10 cm$^3$
Temperature in mixing chamber upon combustion: approx. 3500° C
Temperature at valve seal upon combustion: <250°
Differential pressure on valve seal upon explosion in chamber 16 (FIG. 1): approx. 1000 bar
Differential pressure on valve seal upon explosion in chamber 29 (FIGS. 2, 3): approx. 1000 bar Other gases than those named may be used, for example natural gas or other combustible gases.

I claim:

1. High-temperature combustion shock deburring system comprising
   two deburring valve units (12, 13) having gas duct inlets and outlets,
   means defining a mixing chamber (15) having gas duct inlets;
   first gas conducting means (32) conducting oxygen to the gas duct inlet of one of the valve units (12);
   second gas conducting means (28, 32) separate from said first means and conducting a combustion gas to the gas duct inlet of the other of the valve units (13);
   and separate connecting lines (27) connecting the gas duct outlets of each of said deburring valve units (12, 13) to the gas duct inlets of said mixing chamber (15),
   said deburring valve units, during deburring operation being closed and while in closed condition, being subjected to thermal and pressure shock,
   at least one of said connecting lines (27)
   being characterized in that
   said one line (27) has a length of such extent that the line encloses therein a volume of the respective gas when placed under pressure due to an explosion in the chamber (15), so that the gas will compress and extend in the respective connecting line (27) for a distance from the respective valve unit (13) sufficient to thermally isolate the respective valve unit from the chamber and provide a compressible thermally isolating shock cushion for the respective valve unit and thus protect the respective valve unit against thermal damage and shock.

2. System according to claim 1, wherein each of said valve units (12, 13) comprises
   a housing (10) formed with a bore (26) threin in communication (27) with a combustion chamber (16, 29) and with a gas inlet duct (28) terminating in the bore to supply a combustible gas to the bore and hence to the chamber;

a valve plunger (17) slidable in the bore to selectively permit gas from the gas duct (28) to enter the bore (26) and hence communicate with the chamber, or to seal the gas duct from the chamber and prevent entry of combustion gases from the chamber to the duct, an insert sleeve (25a, 31) located in the bore (26) and having at least a portion thereof and facing the plunger of lesser diameter than the bore (26);

a plastically deformable material (24, 24a, 24b) located between the wall of the bore (26) and said respective portion of the insert sleeve (25a, 31) extending towards the plunger (17) and having an engagement surface engageable by the plunger;

a counter engagement surface (20, 22, 35) formed on the plunger engaging the sealing material;

and a projection (21, 35) extending from the end of the plunger (17) facing the plastically deformable material and hence the sleeve and fitting into the insert sleeve (25a, 31) so that when the plunger and its counter engagement surface are pressed against the deformable material, a tight closing fit between the plunger protection (21, 35) and the sleeve will form by compression of the plastically deformable material and transfer of force in radial direction from the sealing material to the insert sleeve and hence against said projection (21, 35) extending from the plunger (17) to seal the sleeve (25a, 31) against said projection.

3. System according to claim 2, wherein, in each valve unit, (FIGS. 1, 2) the projection (21, 21') extending from the plunger (17, 17') is essentially cylindrical, the sleeve (31, 31') is cylindrical and has an inner diameter fitting around the cylindrical projection (21, 21') of the plunger; and a shoulder (22, 22') is formed between the plunger (17, 17') and the projection (21, 21') extending therefrom, the shoulder engaging the deformable material and forming at least part of the counter engagement surface, the plastically deformable material extending axially in the bore to surround and engage the outer surface of the cylindrical projection to form a sealing material and to seal the projection and the shoulder of the plunger in the bore.

4. System according to claim 1, further comprising a venting valve (33) connected to the first gas conducting means (32) conducting oxygen to the gas duct inlet of said one of the valve units (12), said venting valve venting said first gas conducting means and preventing back-flash or back-fire through said one valve unit (12) and through said first gas conducting means (32).

5. System according to claim 1, wherein each valve unit (12, 13) comprises a housing (10) formed with a bore (26) therein in communication (27) with a combustion chamber (16, 29) and with a gas inlet duct (28) terminating in the bore to supply a combustible gas to the bore and hence to the chamber;

a valve plunger (17) slidable in the bore to selectively permit gas from the gas duct (28) to enter the bore (26) and hence communicate with the chamber, or to seal the gas duct from the chamber and prevent entry of combustion gases from the chamber to the duct, an insert sleeve (25, 31) located in the bore (26) having at least a portion thereof, and facing the plunger, of lesser diameter than the bore;

a projection (21, 35) extending from the plunger (17) in a direction facing the sleeve and fitting into the sleeve;

and means (20, 22, 35; 24, 24a, 24b) transferring axially directed forces from the plunger to inwardly directed radially extending circumferential sealing forces thereagainst, said radial forces being exerted by the sleeve (25, 31) on the projection (21, 35) upon axial inward pressure (P) on the plunger tending to press the plunger into the bore to securely separate the gas duct (28) from the bore (26) and hence the chamber (16, 29).

6. System according to claim 5, wherein the force transfer means comprises a plastically deformable mass (24, 24a, 24b) located at least in part between the wall of the bore and said respective portion of the insert sleeve (25, 31);

and engagement means (22, 35) formed on the plunger, compressing and deforming said deformable mass.

* * * * *